Jan. 2, 1968 L. J. SANTELLI 3,361,429

HIGH FIDELITY PHONOGRAPH

Filed Dec. 15, 1965

INVENTOR

Louis J. Santelli

BY Olson, Trexler, Wolters & Bushnell

Attys.

3,361,429
HIGH FIDELITY PHONOGRAPH
Louis J. Santelli, 581 S. Edgewood Ave., Lombard, Ill. 60148
Filed Dec. 15, 1965, Ser. No. 513,945
2 Claims. (Cl. 274—23)

ABSTRACT OF THE DISCLOSURE

High fidelity record playing apparatus in which a stylus support beam formed of two thin tubes is supported by rotary bearing means in a track for translation in a path parallel to a radial line through the center of the record being played. The beam support track is carried by one end of a swingable lever medially pivoted about a support axis parallel to the beam and having an opposite end coacting with counterbalancing means that determines stylus pressure.

The present invention relates to phonograph record players, and is concerned particularly with the playing of stereophonic records as well as monaural records with utmost fidelity.

To obtain utmost fidelity in the playing of a phonograph record, it is necessary that the pickup and the pickup stylus be located at all times in optimum playing positions in relation to the record being played and the record groove with which the stylus is engaged. The objective of maintaining a pickup in its optimum playing position in relation to a rotating phonograph record, as playing of the record progresses, involves many persistent practical problems and has not, in fact, been achieved in the operation of prior record players suitable for manufacture at a price that could be justified for home use.

The component structure of a phonograph record player that serves to position a pickup in playing relation to a record is often referred to in a general way as a "tone arm." Heretofore, tone arms for phonograph record players, particularly those suited economically for home use, have been marked by functional comprises with the result that utmost fidelity has not been achieved in the use of such prior tone arms in the playing of records because of the inability of such tone arms to maintain a pickup continuously in an ideal playing position in relation to a record as playing of the record progresses.

One object of the invention is to provide a phonograph record player having a new and improved tone arm construction which produces and maintains throughout the playing of a record a positional relationship of a pickup to the record that is virtually ideal for playing the record with utmost fidelity.

Another object is to provide a phonograph record player having new and improved tone arm structure that makes it possible to limit the pressure force of the playing stylus on the record to a very small value, which remains constant throughout playing of the record while, at the same time, enabling very small guiding forces of the record on the stylus to translate the pickup along a straight radial line from the axis of the record and to cause the pickup to continuously follow the record groove closely with no significant unbalancing of the lateral forces applied by the pickup stylus to opposite sides of the record groove.

A further object is to provide for a record player an improved tone arm which enables the pickup, supported by the tone arm, to respond to very small forces of the record on the pickup stylus continuously to follow closely both radial and axial displacements of the running portion of the record groove engaging the stylus while, at the same time, causing the pickup to be translated without rotation along a radial line along the axis of the record as the record is played.

Another object is to provide a tone arm that is particularly advantageous in the playing of stereophonic records by virtue of the capability of the tone arm to provide and maintain throughout playing of a record an optimum positional relationship of the pickup to the record even though the record may be somewhat warped or may be rotating about an eccentric axis or both, and further by virtue of the capability of the tone arm to continuously apply, and continuously balance laterally, very light stylus forces to the record groove so that the pickup provides an optimum response to forces applied to the stylus by opposite sides of the groove.

Still another object is to provide an improved tone arm which achieves the objects previously recited and which is of simple, sturdy structure well suited for economical manufacture for incorporation in record players for home use as well as for professional use.

Other objects and advantages will become apparent from the description of the exemplary embodiment of the invention illustrated in the accompanying drawings, in which.

Figure 1:
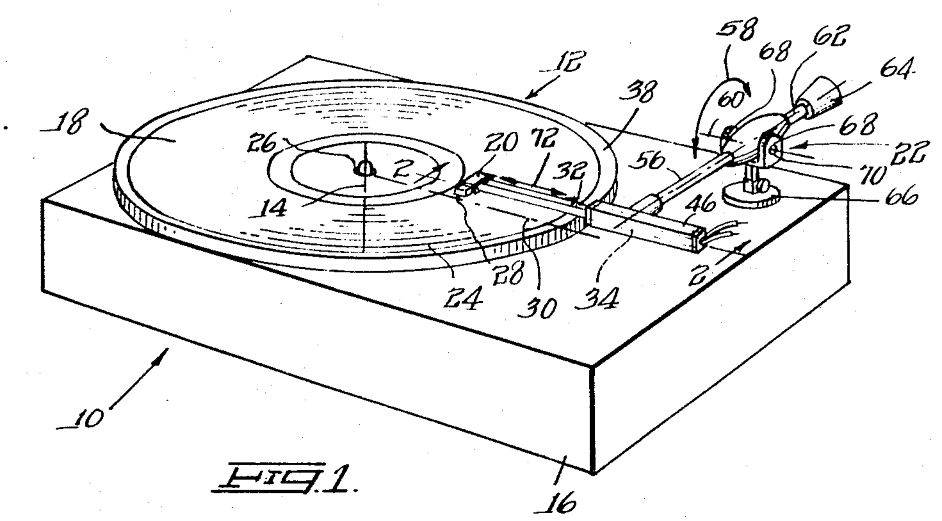
FIGURE 1 is a perspective view of a phonograph record player incorporating a tone arm constructed in accordance with the invention.

Referring to the drawings in greater detail, the phonograph record player 10, forming the exemplary embodiment of the invention illustrated, comprises a horizontal turntable 12 supported and rotated about a vertical axis 14 by a conventional turntable driving mechanism (not shown) housed within an underlying base 16.

A phonograph record 18 supported and rotated by the turntable 12 is played by a pickup 20, brought into and maintained in playing position in relation to the record 18 by a tone arm 22 constructed in accordance with the invention and mounted on the base 16 adjacent the turntable 12, as shown.

Figure 4:
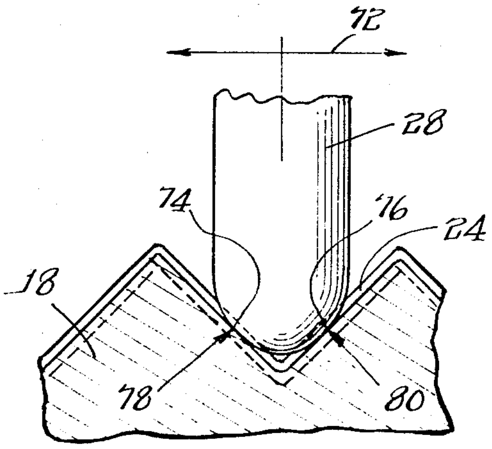
FIG. 4 is a fragmentary sectional view on a greatly enlarged scale showing the tip of a record playing stylus engaged with a record groove and illustrating in phantom lines sound undulations in opposite sides of the record groove.

Even though the pickup 20, is in a relative sense, "stationary" in relation to the rotating record 18, the pickup is in a state of continuous dynamic motion. The dynamic motion of the pickup is produced not only by the radial motion of the pickup required to enable the pickup to follow the spiral record groove 24, FIGS. 1 and 4, but also by cyclic actions which are almost invariably induced by imperfect shaping of the record being played and imperfect positioning of the record in relation to the rotary axis 14 of the turntable.

While the pickup 20 is moving radially in tracking relation to the record groove 24, it may have a cyclic axial motion induced by warpage of the record which is commonly present to some degree. An even more significant complication arises from a cyclic radial motion of the pickup 20 superimposed on the progressive radial motion of the pickup. Cyclic radial motion of the pickup is usually present to some degree as a consequence of the record being rotated about an eccentric axis due to the central hole 26 in the record 18 being somewhat "off center" in relation to the record.

To achieve utmost fidelity in the playing of a typical record 18, the stylus 28 of the pickup 20, which operates in playing engagement with the record groove 24, must be continuously held in an ideal playing position in relation to the record, as playing progresses, and the complex, dynamic motion of the pickup 20, essential to continuous tracking of the record groove, must be accommodated without introducing distortion into the electric signals produced by the pickup as it senses the undulations in the groove corresponding to the recorded sound. It has long been recognized that, for utmost fidelity, the pickup stylus 28 should be translated along a radial line from the rotary axis of the record as the stylus follows the spiral form of the record groove. In moving in this manner, the pickup stylus generally duplicates the motion of the groove cutting stylus used in cutting the original or master record from which the phonograph record being played is made.

Having reference to the drawings, the stylus 28 of the pickup 20 is translated along a straight radial line 30 from the axis 14 of the turntable 12 as playing of the record 18 progresses. The pickup 20, from which the stylus 28 depends and of which the stylus is a part, is affixed to the playing or cantilevering end of an elongated and extremely lightweight support beam 32 which in turn is supported on an elongated track or guide 34 by anti-friction means 36, FIGS. 2 and 3, which reduces frictional resistance to longitudinal movement of the support beam 32 to a negligible and inconsequential entity.

The support track 34 is located radially beyond the periphery of the record 18, and the translatable support beam 32 cantilevers from the support track toward the center of the turntable 12, as shown in FIG. 1. The track 34 not only supports the translatable beam 32 but determines the direction of radial translation of the pickup stylus 28 which, as will presently appear, has a path of translation that is parallel to the support track 34.

The support track 34 itself is parallel to the record support surface 38 of the turntable 12 and is, at the same time, parallel to the previously mentioned radial line 30 extending radially from the axis 14 of the turntable 12 through the position occupied by the playing end of the stylus 28 as it is engaged with a record groove, as shown in FIG. 1.

Figure 2:
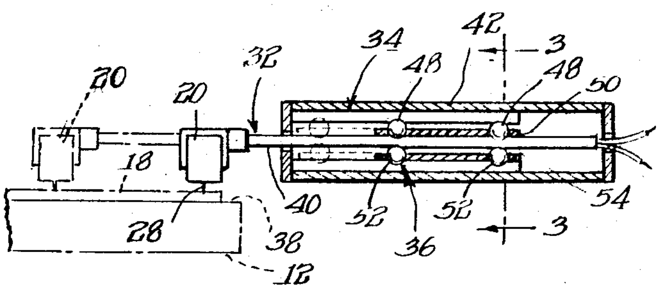
FIG. 2 is a fragmentary sectional view, taken generally with reference to line 2—2 of FIG. 1, showing the pickup in solid lines at the beginning of the playing of a record and illustrating the pickup and its support in phantom lines as playing of the record has progressed.
Figure 3:
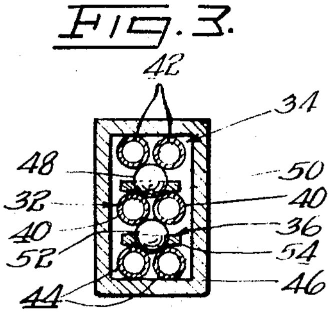
FIG. 3 is a fragmentary sectional view taken along the line 3—3 of FIG. 2.

In the preferred construction illustrated, the translatable pickup support beam 32 is formed by a pair of thin walled and very lightweight tubes 40 positioned on a common level in adjacent parallel relation to each other, as illustrated in FIGS. 2 and 3. The support track indicated generally by the number 34 has a straight upper race formed by an upper pair of parallel adjacent tubes 42 and a straight lower race formed by a lower pair of parallel adjacent tubes 44, parallel to the upper tubes 42. The upper and lower pairs of tubes 42, 44 forming the track 34, are housed within an elongated shell 46 into which the support beam 32 extends.

The anti-friction means 36, used to support the extensible beam 32 on the track 34, comprises two upper bearing balls 48 interposed between the beam tubes 40 and the upper track tubes 42 and spaced from each other by a translatable upper cage plate 50, as shown in FIGS. 2 and 3. Two lower bearing balls 52, forming components of the anti-friction means 36, are inserted between the beam tubes 40 and the lower track tubes 44 and are spaced apart by a translatable lower cage plate 54.

The shell 46, which houses and supports the track 34, is supported for vertical movement between the record playing position shown in FIG. 1 and an elevated record changing position (not shown) in a manner which maintains the support track 34 continuously in parallel relation to both the record support surface 38 on the turntable 12 and the previously mentioned radial line 30 while the shell 46 and track 34 are in the vicinity of the record playing position of the structure illustrated in FIG. 1.

For this purpose, the track housing shell 46 is mounted on the record playing end of a vertically swingable support lever 56 that swings vertically, as indiciated by the arrow 58 in FIG. 1, about a pivotal support axis 60 medially located in relation to the lever. The end 62 of the lever opposite from the record playing end of the lever to which the shell 46 is attached projects away from the track housing shell 46 on the opposite side of the axis 60 for counterbalancing the record playing end of the lever and the pickup and pickup support structure on the record playing end of the lever 56. A counterweight 64 threadedly supported on the counterbalancing end 62 of the lever 56 is adjustable toward and away from the pivotal axis 60 by rotation of the counterweight 64 for the purpose of adjusting the degree of counterbalancing precisely to produce the exact desired degree of stylus pressure on the record, as will be presently referred to in greater detail.

Pivotal support for the lever 56 is provided in the construction shown by a support pedestal 66 mounted on the underlying base 16, as shown in FIG. 1, and having two spaced pivotal support ears 68 extending upwardly in straddling relation to the lever 56 to receive a support pivot 70 which coacts with the ears 68 to support the lever 56 and define the previously mentioned pivotal axis 60 for the lever 56.

The support pivot 70 is located in relation to the lever 56 so that the pivotal axis 60 is precisely parallel to the support track 34 for the translatable pickup support beam 32, and, hence, parallel to the record support surface 38 on the turntable 12 and parallel to the radial line 30 extending from the axis of the turntable through the stylus 28 engaging a record groove.

Preferably, the previously mentioned counterweight 64 on the lever 56 is made substantially heavier than the structure supported on the opposite record playing end of the lever 56 so that the weight 64 can be located relatively close to the lever support axis 60 as compared to the degree of extension of the record playing end of the lever 56 from the axis 60 with the result that the moment of inertia of the lever 56 and its supported structure about the axis 60 is minimized.

It may be noted at this point that, by virtue of the lever support axis 60 being parallel to the radial line 30 along which the record playing stylus 28 translates, progressive extension of the pickup 20 and its translatable support beam 32 away from the track housing casing 46 does not change the spacing of the pickup 20 or any of its support structure from the axis 60. As a consequence, the moment arm of the pickup 20 and its support structure about the axis 60 does not vary as playing of the record progresses and the vertical force or pressure of the record playing stylus 28 in the engaged record groove 24 does not vary as playing of the record progresses. Hence, a desired stylus pressure, once set by adjustment of the counterweight 64, remains constant throughout the playing of individual records unlimited in number.

The construction illustrated and described permits the record playing end of the support lever 56 to be made sufficiently long to cause the pickup 20 to move up and down in a substantially vertical path that is curved only to an inconsequential degree in the vicinity of the record 18 being played. As shown, the record playing end of the lever 56 has a length in the order of one-half the diameter of the record being played. As a consequence, the stylus 28 approaches the record for playing by downward movement of the stylus in a substantially vertical path adjacent the record. Moreover, vertical movements of the stylus 28 and pickup 20 in the course of tracking a groove on a warped record are substantially vertical with the consequence that these vertical movements do not introduce any significant lateral or horizontal movement of the stylus such as would introduce distortion in the reproduction of the recorded sound.

It is helpful to recall here the previous reference made to the cyclic radial movement of the stylus 28 and pickup 20 which is not uncommonly present, to some degree, on account of the record being rotated about an eccentric axis due to its central hole being somewhat off center. Such cyclic radial movements of the stylus 28 are represented by the double ended arrow appearing in FIGS. 1 and 4, and identified by the number 72. These cyclic radial movements 72 result from structural imperfections of the records played and must be accommodated by the pickup support means to maintain tracking of the record groove. As to the significance of these cyclic radial movements, it is helpful to refer to the enlarged transverse sectional view of a stereophonic record groove 24 shown in an enlarged section in FIG. 4. Two independent sound tracks are recorded by the undulated surfaces 74, 76 forming the opposite sides of the record groove 24, as shown. These undulated surfaces 74, 76 on opposite sides of the record groove 24 apply two generally opposed forces 78, 80 to the tip of the stylus 28, as indicated by the arrows represented by the numbers 78, 80 in FIG. 4.

It is the forces 78, 80 exerted on the stylus 28 that move the stylus in accordance with the recorded sound to generate, in the playing of a stereophonic record, the two channels of sound signals reproducing the recorded sound. To achieve maximum fidelity in the reproduction of the sound signals, it is desirable to limit the forces 78, 80 to those required for the essential function of displacing the record stylus 28 in accordance with the recorded sound signals to be reproduced.

Yet, it is these same forces 78, 80, or a combination of them, which must serve the function of radially displacing the pickup 20 so that it will remain in tracking relation to the record groove, this radial displacement of the pickup being essential and unavoidable, as previously indicated.

In the tone arm structure previously described and identified generally in FIG. 1 by the number 22, the only components of significance which move radially with the pickup 20 are the extremely lightweight support beam 32 and the even more lightweight anti-friction structure 36 which is displaced to a degree even less than that of the support beam. None of the remaining structure, including the support lever 56, counterweight 64, shell 46 and track 34, used in providing support to the pickup 20, is displaced in the slightest degree by radial translation of the pickup 20.

It will be appreciated that the radial force required to move the pickup 20 radially, and particularly the radial force required to move the pickup 20 cyclically in a radial direction, is a function of the effective inertia of the structure which moves with the pickup 20 and the frictional resistance to movement of the structure which moves with the pickup 20. As indicated, the only structure which moves radially with the pickup 20 is the very lightweight support beam 32 and the even lighter anti-friction means 36. Consequently, the inertia of the structure movable radially with the pickup 20 is extremely limited. Because of the light weight of the radially movable structure, and by virtue of the friction limiting capability of the anti-friction support 36, the frictional resistance to radial movement of pickup 20 is negligible. As a consequence, the radial forces required to effect the necessary radial displacement of the pickup 20 are extremely small.

The consequential minimization of the radial forces required to displace the pickup 20 radially makes it possible to limit the forces 78, 80, which must be exerted by the record groove on the stylus 28, generally to the forces required for exciting the pickup 20 to produce the desired electric sound signals corresponding to the recorded sound. By virtue of the record forces 78, 80 having to exert only an extremely limited force on the pickup 20 to maintain the pickup in tracking relation to the groove, the vertical force with which the stylus 28 must be pressed downwardly into the groove may be correspondingly limited, all to the end that the fidelity with which the recorded sound is reproduced is enhanced. The vertical pressure or force which the stylus 28 applies against the record can be adjusted to any desired small value by adjustment of the counterweight 64 on the vertically swingable lever 56.

To change a record, the lever 56 is swung up and the pickup support beam 32 retracted, motions which are reversed after a new record is placed on the turntable to start playing of the next record. If desired, suitable power operating means can be added to perform these functions.

The invention is claimed as follows:

1. A record player comprising, in combination, a turntable rotatable about a turntable axis, a support lever, stationary support means coacting with a medial portion of said lever to pivotally support the lever for swinging movement about a pivotal axis therefor, said support lever having a playing end and a counterbalancing end extending in generally opposite directions from said pivotal axis of the lever, said playing end of said lever extending alongside said turntable; said lever being swingable about said pivotal axis to move said playing end of the lever between a lifted, record changing position and a lowered, record playing position; a reciprocable support beam formed by two parallel thin wall tubes, a support track affixed to said playing end of the support lever and being formed by an upper pair of parallel cylindrical members overlying the thin wall tubes of the beam and by a lower pair of parallel cylindrical members underlying said thin wall tubes of the beam, anti-friction bearing means supporting said support beam on said support track for translation substantially without friction in a straight linear path located in a position in space determined by said support track, said anti-friction bearing means comprising bearing balls intervening between said beam tubes of the beam and said upper pair of track members in rolling engagement therewith and bearing balls intervening between said beam tubes and said lower track tubes in rolling engagement therewith, an electrical pickup supported on the turntable end of said support beam and including a stylus having a playing end for engagement with the spiral groove of a record on said turntable, said support track being oriented on said lever so that when said playing end of the lever is in said record playing position thereof both said support track and said linear path determined by the track are parallel to said turntable and are parallel to a straight line extending radially from said turntable axis through said playing end of the stylus, said pivotal axis of said lever being parallel to said track and to said linear path predetermined by said track, and a counterweight adjustably mounted on said counterbalancing end on said lever for adjustment forward and away from said pivotal axis of said lever to vary the force of engagement of said stylus on a record on said turntable.

2. For use with a rotary record supporting turntable, a tone arm comprising a movable support lever, a reciprocable support beam formed by two thin wall tubes, a support track located on said lever for movement therewith and being formed by an upper straight race overlying said beam tubes and by a lower straight race underlying said beam tubes, rotary bearing means interposed between said beam tubes and said upper and lower races respectively to support said beam on said track with a negligible resistance to translation of said beam with reference to said track so that said beam is translatable on said track substantially without resistance in a straight linear path, an electrical pickup supported on a projecting end of said support beam and including a stylus having a playing end for engagement with a record groove; a stationary support means coacting with said lever to pivotally support the lever for swinging movement about a pivotal axis disposed in spaced, parallel relation to the straight linear path of said stylus as determined by said track; said lever being swingable about said pivotal axis thereof to shift said track between a lifted, record changing position and a lowered, record playing position and to effect movement of said track in a direction generally perpendicular to the straight linear path of said stylus as determined by the track while the track is in its record playing position; said lever extending to opposite sides of said pivotal axis thereof, and adjustable counterbalancing means coacting with the lever on the side of said pivotal axis opposite from said support track to counterbalance the lever and the structure thereon to provide for the lever and the structure thereon a regulated degree of unbalance corresponding to the desired record playing stylus pressure.

References Cited

UNITED STATES PATENTS

| | | | |
|---|---|---|---|
| 2,935,326 | 5/1960 | Grunwald | 274—23.1 |
| 2,947,542 | 8/1960 | Grunwald | 274—10 |
| 3,088,742 | 5/1963 | Alexandrovich | 274—23.1 |

FOREIGN PATENTS

| | | |
|---|---|---|
| 775,497 | 5/1957 | Great Britain. |

HARRY N. HAROIAN, *Primary Examiner.*

LEONARD FORMAN, *Examiner.*